United States Patent
Nenner

(10) Patent No.: US 10,244,433 B2
(45) Date of Patent: Mar. 26, 2019

(54) ENHANCED MOBILITY MANAGEMENT WITHIN A MOBILE COMMUNICATION NETWORK

(71) Applicant: Deutsche Telekom AG, Bonn (DE)

(72) Inventor: Karl-Heinz Nenner, Bornheim (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 15/593,351

(22) Filed: May 12, 2017

(65) Prior Publication Data
US 2017/0332284 A1    Nov. 16, 2017

(30) Foreign Application Priority Data

May 13, 2016   (EP) .................................... 16169632

(51) Int. Cl.
| | |
|---|---|
| *H04W 36/00* | (2009.01) |
| *H04W 36/08* | (2009.01) |
| *H04W 8/22* | (2009.01) |
| *H04W 36/24* | (2009.01) |
| *H04W 36/30* | (2009.01) |

(Continued)

(52) U.S. Cl.
CPC ... *H04W 36/0016* (2013.01); *H04W 36/0061* (2013.01); *H04W 36/08* (2013.01); *H04W 8/22* (2013.01); *H04W 36/245* (2013.01); *H04W 36/30* (2013.01); *H04W 36/36* (2013.01); *H04W 48/20* (2013.01)

(58) Field of Classification Search
CPC ........... H04W 36/0016; H04W 36/006; H04W 36/08

USPC ......................................................... 455/436
See application file for complete search history.

(56) References Cited

U.S. PATENT DOCUMENTS

| | | | | |
|---|---|---|---|---|
| 2003/0190916 | A1* | 10/2003 | Celedon ............ | H04W 36/0083 455/437 |
| 2010/0075677 | A1* | 3/2010 | Wang ................ | H04W 36/0055 455/436 |
| 2011/0269462 | A1* | 11/2011 | Sagfors ................. | H04W 36/36 455/436 |

OTHER PUBLICATIONS

"3rd Generation Partnership Project; Technical Specification Group Services and System Aspects; Study on Architecture for Next Generation System (Release 14)", 3GPP Standard; 3GPP Tr 23.799, 3rd Generation Partnership Project (3GPP), Mobile Competence Centre; 650, Route Des Lucioles; F-06921 Sophia-Antipolis Cedex; France, vol. SA WG2, No. V0.4.0, Apr. 27, 2016 (Apr. 27, 2016), pp. 1-92, XP051123441.

(Continued)

*Primary Examiner* — Chuck Huynh
(74) *Attorney, Agent, or Firm* — Leydig, Voit & Mayer, Ltd.

(57) ABSTRACT

A method for enhanced mobility management within a mobile communication network includes: generating, by the user equipment, information regarding a first radio cell and a second radio cell, and/or receiving, by the user equipment, information regarding the first radio cell and the second radio cell from the first radio cell and/or the second radio cell; and selecting, by the user equipment, either the first radio cell or the second radio cell, and/or requesting, by the user equipment, on-demand mobility support from the mobile communication network. The second step is performable by the user equipment both in case that the user equipment is in an idle state and in case that the user equipment is in a connected state.

10 Claims, 1 Drawing Sheet

(51) Int. Cl.
    *H04W 36/36*     (2009.01)
    *H04W 48/20*     (2009.01)

(56) References Cited

OTHER PUBLICATIONS

"3$^{rd}$ Generation Partnership Project; Technical Specification Group Services and System Aspects; Feasibility Study on New Services and Markets Technology Enablers—Network Operation; Stage 1 (Release 14)", 3GPP Standard; 3GPP TR 22.864, 3$^{rd}$ Generation Partnership Project (§GPP), Mobile Competence Centre; 650, Route Des Lucioles; F-06921 Sophia-Antipolis Cedex; France, vol. SA WG1, No. V1.0.0, Mar. 9, 2016 (Mar. 9, 2016), pp. 1-24, XP051087909.
Peter Merz: "5G Network Architecture A healthy balance between Evolution and Revolution", Johannesberg Summit, Dec. 31, 2015 (Dec. 31, 2015), XP055304498.

\* cited by examiner

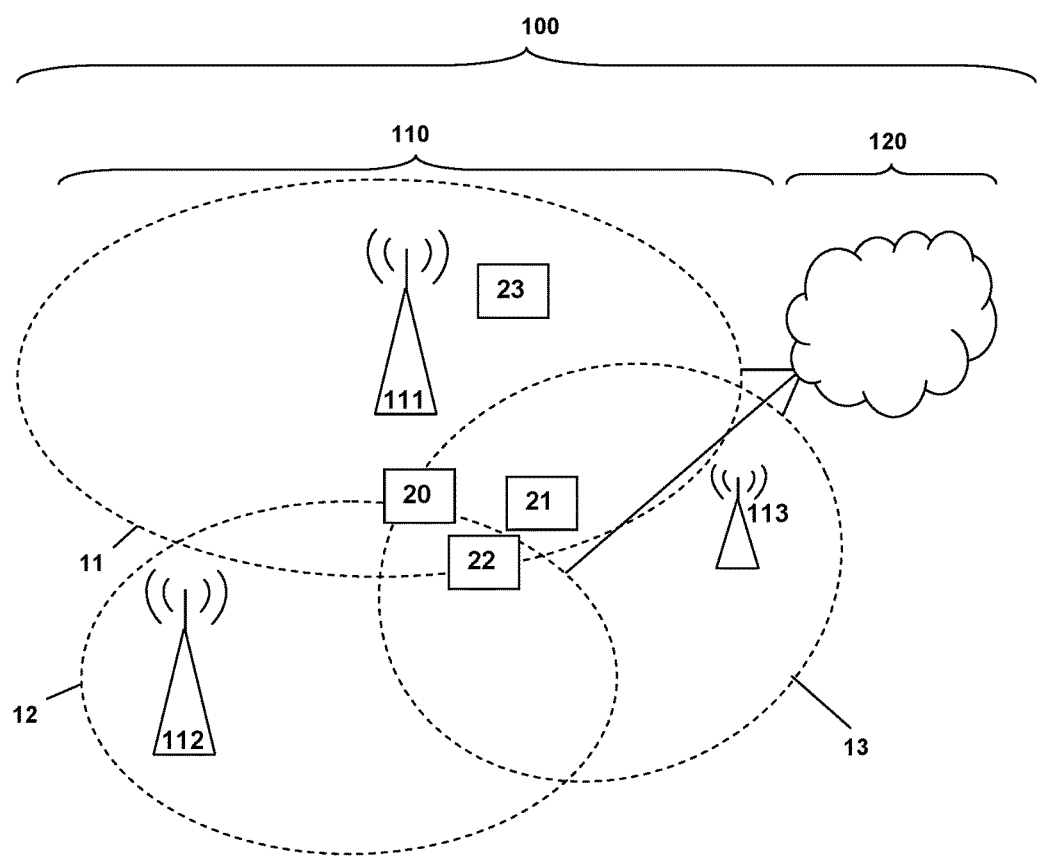

ENHANCED MOBILITY MANAGEMENT WITHIN A MOBILE COMMUNICATION NETWORK

CROSS-REFERENCE TO RELATED APPLICATIONS

Priority is claimed to European Patent Application No. EP 16169632.3, filed on May 13, 2016, the entire disclosure of which is hereby incorporated by reference herein.

FIELD

The present invention relates to a method for enhanced mobility management within a mobile communication network, the mobile communication network comprising an access network having a plurality of radio cells and base station entities, wherein at least one user equipment of a plurality of user equipments is able to select, as its serving radio cell, at least either a first radio cell of the plurality of radio cells or a second radio cell of the plurality of radio cells.

The present invention further relates to a system for enhanced mobility management within a mobile communication network, as well as a mobile communication network, the system comprising the mobile communication network and at least one user equipment, wherein the at least one user equipment of a plurality of user equipments is able to select, as its serving radio cell, at least either a first radio cell of a plurality of radio cells or a second radio cell of the plurality of radio cells.

Furthermore, the present invention relates to a user equipment for enhanced mobility management within a mobile communication network, and to a base station entity for enhanced mobility management of user equipments within the mobile communication network, wherein the user equipment is able to select, as its serving radio cell, at least either a first radio cell of a plurality of radio cells or a second radio cell of the plurality of radio cells.

Additionally, the present invention relates to a program and a computer program product.

BACKGROUND

In present day cellular networks, i.e. mobile communication networks, user equipments can be associated with a certain number of states or modes. These states or modes typically at least comprise a so-called idle mode and at least one connected mode. Regarding mobility of such user equipments, associated with the mobile communication network, i.e. typically camping on one or the other of the radio cells of the mobile communication network, there is typically a distinction between idle mode mobility and connected mode mobility. The radio cell a user equipment is currently camping on (or is related or associated with) is normally called the serving radio cell of the respective user equipment. In idle mode, a user equipment may change radio cells autonomously (i.e. change the serving radio cell), based on certain (radio) criteria. Typically, the user equipment notifies the mobile communication network (or at least parts thereof, such as a base station entity of the access network or a network node of the core network) only when the new serving radio cell is in another part (normally called "location area") of the mobile communication network. In connected mode, a handover procedure is typically performed (handing the user equipment over from a radio cell (or source radio cell) serving the user equipment prior to the handover procedure to a radio cell (or target radio cell) serving the user equipment subsequent to the handover procedure), the handover procedure being usually a network controlled procedure, performed to change the serving cell. Normally, this results in changing the association of the user equipment with the old (or source) radio cell to an association of the user equipment with the new (or target) radio cell concurrently (or at least in comparatively close timely proximity) with the handover, thereby changing the traffic routing for the user equipment from the old (or source) radio cell to the new (or target) radio cell.

SUMMARY

In an exemplary embodiment, the invention provides a method for enhanced mobility management within a mobile communication network, the mobile communication network comprising an access network having a plurality of radio cells and base station entities, wherein at least one of the base station entities is associated or assigned to each of the radio cells, wherein a plurality of user equipments are associated with the mobile communication network, wherein at least one user equipment of the plurality of user equipments is able to select, as its serving radio cell, at least either a first radio cell of the plurality of radio cells or a second radio cell of the plurality of radio cells. The method includes: in a first step, generating, by the user equipment, information regarding the first radio cell and the second radio cell, and/or receiving, by the user equipment, information regarding the first radio cell and the second radio cell from the first radio cell and/or the second radio cell; and in a second step, subsequent to the first step, selecting, by the user equipment, either the first radio cell or the second radio cell, and/or requesting, by the user equipment, on-demand mobility support from the mobile communication network. The second step is performable by the user equipment both in case that the user equipment is in an idle state and in case that the user equipment is in a connected state.

BRIEF DESCRIPTION OF THE DRAWINGS

The present invention will be described in even greater detail below based on the exemplary FIGURES. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 schematically illustrates a mobile communication network, having a plurality of radio cells that cover, together, a certain geographic area, the mobile communication network comprising a core network and an access network as well as a plurality of user equipments.

DETAILED DESCRIPTION

Exemplary embodiments of the present invention provide a more flexible, less resource-intensive and/or (signaling) overhead-intensive solution for radio cell selection of a user equipment within a mobile communication network that provides the possibility of a better overall utilization of the communication resources of the mobile communication network, and hence contributes to a higher level of user experience of the user equipments using the mobile communication network.

In an exemplary embodiment, the present invention provides a method for enhanced mobility management within a mobile communication network, the mobile communication network comprising an access network having a plurality of radio cells and base station entities, wherein at least one of the base station entities is associated or assigned to each of the radio cells, wherein a plurality of user equipments are associated with the mobile communication network,
wherein at least one user equipment of the plurality of user equipments is able to select, as its serving radio cell, at least either a first radio cell of the plurality of radio cells or a second radio cell of the plurality of radio cells,
wherein the method comprises the following steps:
  in a first step, the user equipment itself generates information regarding the at least first and second radio cell and/or receives—from the first radio cell and/or the second radio cell, or from the associated or assigned base station entities, respectively—information regarding the at least first and second radio cell,
  in a second step, subsequent to the first step, the user equipment selects at least one alternative of the list of alternatives comprising
    selecting either the first radio cell or the second radio cell, and
    requesting on-demand mobility support from the mobile communication network,
wherein the selection of the second step is performed, by the user equipment, both in case that the user equipment is currently in idle state and in case that the user equipment is currently in connected state.

It is thereby advantageously possible according to the present invention that the user equipment (i.e. at least a part of the total number of user equipments using the mobile communication network) is able to perform the selection between the first and second radio cell, i.e. to decide about which one radio cell (of the reachable radio cells, i.e. those having a reasonable signal strength or other radio-related parameters) the user equipment seeks to be connected with and/or chooses as the serving radio cell.

Typically, a user equipment has one serving radio cell. In case the user equipment is in idle mode or idle state, the serving radio cell typically corresponds to the radio cell from which the user equipment receives the paging information (in order to be able to be reached in case of a mobile terminated call or other event). In case the user equipment is in connected mode or connected state (such as, e.g., packet data network connected or radio resource control (RRC) connected mode), the serving radio cell corresponds to the radio cell providing the downlink data (packets or streams) towards the user equipment, typically coinciding with the radio cell receiving the uplink data (packets or streams) transmitted from the user equipment towards the mobile communication network. However, it is conceivable that a user equipment could also be served (either continuously or at least during certain time intervals, e.g. time intervals prior and after a change of the radio cell by the user equipment) by more than one radio cell, i.e. by a group of radio cells, such as by two or three or four or even more radio cells.

According to the present invention, it is assumed that the considered user equipment has the ability to select between the first and second radio cell (or has, alternatively or cumulatively to choosing between the first and second radio cell, also the option to request on-demand mobility support from the mobile communication network), i.e. to choose either the first radio cell or the second radio cell (but not both).

In case the situation is considered that the user equipment should also have the opportunity to be related to still another radio cell (in addition to either the first radio cell or the second radio cell), a third radio cell could be considered, i.e. the user equipment would be related (or connected) to the third radio cell and would select either the first radio cell or the second radio cell (as further radio cell, besides the third radio cell).

According to still another alternative embodiment of the present invention, the first and second radio cells could also be understood as representing groups of radio cells, respectively, and the user equipment would select either the first radio cell (i.e. group of radio cells) or the second radio cell (i.e. group of radio cells).

According to the present invention, the user equipment is informed about the first and second radio cells in order to be able to make the decision which one of the two radio cells, is expected to provide the best or the most adapted communication service to the user equipment. Therefore, the method according to the present invention comprises (as a first step) the step of generating information regarding the at least first and second radio cell and/or of receiving—from the first radio cell and/or the second radio cell, or from the associated or assigned base station entities, respectively—information regarding the at least first and second radio cell. Generating information regarding the first and second radio cells typically involves performing measurements regarding the radio environment at the current position of the user equipment. The information received by the user equipment about the first and second radio cell is typically information broadcast by the first and second radio cells themselves but could also be provided (to the user equipment) via other paths and/or sources.

Once the user equipment is provided with sufficient information about the first radio cell and the second radio cell, the user equipment is able to make an informed decision about whether
  to attempt to use the first radio cell as (the only or as an additional—e.g. additionally to a third radio cell) serving radio cell, or
  to attempt to use the second radio cell as (the only or as an additional) serving radio cell, or
  to request on-demand mobility support from the mobile communication network.
According to the present invention, it is advantageously possible that the user equipment is able to use the same mobility mechanism in both idle and active state (i.e. it is enabled to perform the selection about whether to use the first or the second radio cell as serving cell), leading to the advantageous possibility of selecting the radio cell (among the first and second radio cell) that at least potentially provides the highest probability of service fulfillment (in addition to or instead of some radio conditions), and to additionally be able to activate a certain level of mobility support on-demand if need be.

Regarding the selection (performed in a second step) of taking either the first or the second radio cell as serving radio cell, this provides the possibility that the user equipment is responsible for selecting the serving radio cell in both idle and connected modes, i.e. regardless of idle or connected mode of the user equipment, or whether the user equipment has an RRC connection, a packet data network (PDN) connection, or is engaged in active signaling or data transfer. Only in cases where this mechanism (i.e. the selection among the first and second radio cell by the user equipment) would not maintain or is reputed to not maintain or is expected to not maintain the required service level (e.g. in cases of an active critical data transfer, or of a guaranteed quality-of-service (class) or of a guaranteed quality-of-service parameter), the user equipment chooses to request on-demand support for the management of its mobility towards the mobile communication network; the on-demand support might result in a conventionally known handover procedure, performed under the control of the mobile communication network. Such situations or cases refer to situations where the user equipment-based mobility mechanism is inappropriate with respect to the service requirements. For example, re-selecting to a new radio cell while the user equipment is in active communication may interrupt the communication for too long so that the delay or packet loss ratio required for the active service cannot be met. Another example is a quality-of-service guarantee in the old radio cell (source radio cell) where the necessary resources in the new radio cell (target radio cell) need to be reserved prior to the cell change. In such cases, it is advantageously possible for the user equipment to activate different (more sophisticated) mobility management procedure for the user equipment. The decision not to apply user equipment based mobility management (but instead request (on-demand) network support or enforce network control for mobility management purposes) can either be triggered by the user equipment (i.e. "on-demand") or by the mobile communication network, or negotiated involving both the user equipment, and the mobile communication network. When the situation of the user equipment (regarding, e.g., an ongoing active communication of the user equipment, potentially with quality-of-service guarantee) relaxes, and the on-demand mobility support of the mobile communication network or the network inflicted mobility management (in both cases typically sophisticated mobility management methods or procedures) are no longer needed by the user equipment, such methods and procedures may be disabled accordingly—and returned to the user equipment-based mobility mechanism.

According to an advantageous embodiment of the present invention, the selection of the second step is performed by the user equipment also in case that the user equipment currently:
 has a radio resource control connection (RRC connection) with the mobile communication network, or
 has a packet data network connection (PDN connection) with the mobile communication network, or
 is engaged in active signaling or data transfer.

Thereby, it is advantageously possible according to the present invention that the user equipment uses the same mobility mechanism irrespective of its state or mode.

According to a further advantageous embodiment of the present invention, the plurality of radio cells of the mobile communication network broadcast cell resource utilization information.

Thereby, it is advantageously possible according to the present invention that the user equipment is informed about the level of utilization of the resources of the first and second radio cell. Each radio cell of the mobile communication network should broadcast the cell resource utilization information in order to enable the user equipment(s) to perform a calculation regarding which radio cell is expected to provide the best possible service experience to the user equipment.

According to a further advantageous embodiment of the present invention, the selection of the second step is based on the highest probability of service fulfillment, by either the first radio cell or the second radio cell, of a communication service that
 either is currently requested by the user equipment, and/or
 is likely to be requested by the user equipment in future, and/or
 has been requested by the user equipment in the past,
wherein the selection of the second step is especially based on—in addition to or instead of parameters related to the radio environment of the user equipment—at least one out of the following:
 radio capabilities of the user equipment, especially the radio capabilities of the user equipment regarding usable frequency bands, usable modulation schemes, usable multiple input multiple output (MIMO) and/or multipath techniques,
 radio capabilities of the potentially selectable radio cells, especially the first radio cell and the second radio cell, and especially the radio capabilities of the potentially selectable radio cells regarding usable frequency bands, usable modulation schemes, usable multiple input multiple output (MIMO) and/or multipath techniques,
 cell resource utilization information, especially comprising information about which part of the resources in terms of usable uplink and/or downlink radio transmission bandwidth and/or radio transmission resource blocks is currently already occupied or in tendency likely to be occupied,
 a class the user equipment is assigned to, especially whether the user equipment is, at least predominantly, an internet-of-things device (IoT device), a mobile broadband device (MBB device), a voice centric device and/or a data centric device,
 subscription information, especially regarding services the user equipment is allowed to access, bit rates and/or quality-of-service (QoS) levels the user equipment is allowed to use,
 history information regarding communication services requested by the user equipment in the past and/or prior communication behavior of the user equipment,
 whether the user equipment is currently RRC connected,
 whether the user equipment is currently packet data network (PDN) connected,
 characteristics of an active packet data network (PDN) connection, especially in terms of service class,
 whether the user equipment is currently transmitting data to the mobile communication network and/or receiving data from the mobile communication network.

Via the user equipment basing its selection (of the second step, whether to either select the first radio cell or the second radio cell or to request on-demand support for cell selection/handover) on the highest probability of service fulfillment, it is advantageously possible to increase the likelihood of service fulfillment and, hence, also the overall level of user experience within the mobile communication network, at least in case that a sufficiently high proportion of all user equipments present in the mobile communication network also apply exemplary embodiments of the present invention. According to the present invention, a relatively higher responsibility (regarding the decision of radio cell selection and re-selection) is put on the user equipment. This is justified due to the fact that, typically, the user equipment is closer to the (communication) needs of a user (of the user equipment), and it is, hence, easier to predict (or an attempt to predict the behavior of the user, e.g., in terms of immediately expectable communication service needs, is likely to be predictable with higher accuracy) future communication needs by the user equipment compared to by the radio cell. Additionally, storing (historical) pattern of communications needs of the user/user equipment—e.g. regularly recurring communication needs of the user at certain times of a time period (e.g. of a day, or of a week, or of a month, or of a year), or more or less regular successive communication needs (or sequences of communication needs)—that could be used to (more precisely) predict communication needs of the user in the future (on a reasonable time scale of, say, 1, 2, 5, 10, 15, 20, 30, 60, 80 or 90 seconds, or a couple of minutes) is potentially more compliant from a data protection point of view than storing such data in a network node of the mobile communication network; additionally, having the user equipment make the decision whether to select the first radio cell or the second radio cell or to request on-demand support from the mobile communication network potentially reduces network load, especially regarding signaling load between network nodes of the core network and/or of the access network, especially regarding base station entities and a (core) network node that would otherwise be needed to store such historical pattern data regarding communication needs of the user of the user equipment.

The selection of the user equipment of the second step (i.e. whether to select the first radio cell or the second radio cell or whether to request on-demand mobility support from the mobile communication network) is advantageously based on a number of pieces of information or parameters. In conventionally known mobile communication networks, parameters related to the radio environment of a user equipment are typically used to select (but under the control of the mobile communication network) which one of a plurality of radio cells should be selected by the user equipment—i.e. especially (radio) signal strength information or (radio) signal quality information regarding radio signals of either the first radio cell or the second radio cell are taken into consideration in this selection decision. According to the present invention, such radio (signal strength and/or signal quality)-related parameters can be ignored (in selecting the radio cell), i.e. replaced by the other pieces of information or parameters, but do not need to be ignored, i.e. advantageously, the decision of which one of a plurality of possible radio cells is to be selected also takes into consideration the (radio) signal strength and/or (radio) signal quality of the radio signals received (or likely to be received in (the near) future) at or by the user equipment.

According to the present invention, it is advantageously possible to base the selection of the second step on one or a plurality of the following pieces of information or parameters, i.e. the user equipment calculates—for any suitable radio cell of a plurality of radio cells the user equipment receives sufficiently strong radio signals from (this typically comprising surrounding radio cells or radio cells having a radio coverage area in the vicinity of current location of the user equipment)—the radio cell which is expected to provide the best possible service experience, especially based on the following parameters:

the radio capabilities of the user equipment, e.g. whether the user equipment is able to connect to different radio cells simultaneously or almost simultaneously,
the radio capabilities of the potentially selectable radio cell—i.e. of at least the first radio cell and the second radio cell;
cell resource utilization information,
the class (or device class) of the user equipment or to which the user equipment is assigned;
subscription information and/or history information regarding the user equipment;
the current connection status and connection characteristics of the user equipment (i.e. whether it is RRC connected, or packet data network (PDN) connected, or which is the service class or other characteristics of the packet data network (PDN) connection of the user equipment, or whether the user equipment is currently transmitting data to the mobile communication network and/or is receiving data from the mobile communication network).

According to the present invention, it is furthermore advantageous that cell resource utilization information comprise at least one out of the following:

idle load utilization information of the respective radio cell, the idle load utilization information being especially based on history information of user equipments connecting to that radio cell,
connected load utilization information of the respective radio cell, the connected load utilization information being especially based on the number of user equipments that have an radio resource control (RRC) connection with that radio cell,
quality-of-service class utilization information of the respective radio cell, the quality-of-service class utilization information especially corresponding to the share of utilized resources per quality-of-service class and/or service data flow class and/or per quality-of-service parameter set such as delay and/or average throughput and/or packet loss,
movement-related utilization information of the respective radio cell, especially regarding radio cells located close to or adjacent to major human transportation lines,
utilization tendency indicator, especially regarding expected growth or decrease of utilization of the resources of the respective radio cell.

Thereby, it is advantageously possible according to the present invention that the selection between different radio cells can be made on the basis of the most appropriate resource utilization information or on the basis of a plurality of the most appropriate pieces of resource utilization information.

It is furthermore advantageous according to the present invention that, upon the user equipment selecting the first radio cell or the second radio cell, a service fulfillment information is transmitted, by the user equipment, to the respective (selected) radio cell, wherein the method comprises, in a further step, that a service fulfillment match information is generated by the selected radio cell.

Via transmitting, by the user equipment, a service fulfillment information to the respective (selected) radio cell, it is advantageously possible according to the present invention that the user equipment communicates to the radio cell(s) (or exchanges with the radio cell or radio cells) the result of the calculation regarding which radio cell is expected or likely to provide which level of service experience to the user equipment, i.e. when the user equipment selects a new radio cell and if the user equipment communicates with that radio cell (e.g. because an update to the user equipment data path from and old (or source) radio cell to a new (or target) radio cell needs to be triggered), a match indicator (i.e. a service fulfillment match information) is advantageously calculated between the expectation regarding service fulfillment of the user equipment on the one hand, and of the respective radio cell on the other hand. This service fulfillment match information is advantageously used in deciding if and when to perform cell (re)selection again.

According to still another advantageous embodiment of the present invention, the selection of the second step is performed taking into account a hysteresis factor, the hysteresis factor being either generated by the user equipment or assigned to the user equipment or dependent on the service fulfillment match information, transmitted from the selected radio cell to the user equipment.

Via taking into account the hysteresis factor, it is advantageously possible that toggling (i.e. a user equipment repeatedly (and on a comparatively short time scale) changing between either two radio cells or between a plurality of radio cells) is avoided. Hysteresis values advantageously vary per user equipment to avoid many user equipments reselecting radio cells simultaneously, which could potentially result in an increased likelihood of toggling, especially result in a plurality of user equipments toggling between radio cells. Especially, the service fulfillment match information (or match indicator) is advantageously taken into account for the calculation of the hysteresis or applying the hysteresis factor.

Furthermore, the present invention relates to a system for enhanced mobility management within a mobile communication network, the system comprising the mobile communication network and at least one user equipment, wherein the mobile communication network comprises an access network having a plurality of radio cells and base station entities, wherein at least one of the base station entities is associated or assigned to each of the radio cells, wherein a plurality of user equipments are associated with the mobile communication network,
wherein the at least one user equipment of the plurality of user equipments is able to select, as its serving radio cell, at least either a first radio cell of the plurality of radio cells or a second radio cell of the plurality of radio cells,
wherein the system is configured such that:
  the user equipment itself generates information regarding the at least first and second radio cell and/or receives—from the first radio cell and/or the second radio cell, or from the associated or assigned base station entities, respectively—information regarding the at least first and second radio cell,
  the user equipment selects at least one alternative of the list of alternatives comprising
    selecting either the first radio cell or the second radio cell, and
    requesting on-demand mobility support from the mobile communication network,
wherein the selection is performed, by the user equipment, both in case that the user equipment is currently in idle state and in case that the user equipment is currently in connected state.

Thereby, it is advantageously possible according to the present invention that at least a part of the user equipments associated with the mobile communication network are able to perform a user equipment-based mobility management, i.e. the selection between the first and second radio cell the user equipment seeks to be connected with and/or chooses as its serving radio cell is, at least in many or most cases, made by the user equipment—also while in connected mode.

Additionally, the present invention relates to a mobile communication network for enhanced mobility management, wherein the mobile communication network comprises an access network having a plurality of radio cells and base station entities, wherein at least one of the base station entities is associated or assigned to each of the radio cells, wherein a plurality of user equipments are associated with the mobile communication network, wherein the at least one user equipment of the plurality of user equipments is able to select, as its serving radio cell, at least either a first radio cell of the plurality of radio cells or a second radio cell of the plurality of radio cells,
wherein the mobile communication network is configured such that:
  the user equipment itself generates information regarding the at least first and second radio cell and/or receives—from the first radio cell and/or the second radio cell, or from the associated or assigned base station entities, respectively—information regarding the at least first and second radio cell,
  the user equipment selects at least one alternative of the list of alternatives comprising
    selecting either the first radio cell or the second radio cell, and
    requesting on-demand mobility support from the mobile communication network,
wherein the selection is performed, by the user equipment, both in case that the user equipment is currently in idle state and in case that the user equipment is currently in connected state.

Thereby, it is advantageously possible according to the present invention that at least a part of the user equipments associated with the mobile communication network are able to perform a user equipment-based mobility management, i.e. the selection between the first and second radio cell the user equipment seeks to be connected with and/or chooses as its serving radio cell is, at least in many or most cases, made by the user equipment—also while in connected mode.

Additionally, the present invention relates to a user equipment for enhanced mobility management within a mobile communication network, the mobile communication network comprising an access network having a plurality of radio cells and base station entities, wherein at least one of the base station entities is associated or assigned to each of the radio cells,
wherein the user equipment is able to select, as its serving radio cell, at least either a first radio cell of the plurality of radio cells or a second radio cell of the plurality of radio cells, wherein the user equipment is configured such that:
  the user equipment itself generates information regarding the at least first and second radio cell and/or receives—from the first radio cell and/or the second radio cell, or from the associated or assigned base station entities, respectively—information regarding the at least first and second radio cell,
  the user equipment selects at least one alternative of the list of alternatives comprising
    selecting either the first radio cell or the second radio cell, and
    requesting on-demand mobility support from the mobile communication network,
wherein the selection is performed, by the user equipment, both in case that the user equipment is currently in idle state and in case that the user equipment is currently in connected state.

Thereby, it is advantageously possible according to the present invention that a user equipment-based mobility management is realized—also while the user equipment being in connected mode.

Furthermore, the present invention relates to a base station entity for enhanced mobility management of user equipments within a mobile communication network, the mobile communication network comprising an access network having a plurality of radio cells and base station entities, wherein the base station entity is associated or assigned to one of the radio cells, wherein a plurality of user equipments are associated with the mobile communication network,
wherein at least one user equipment of the plurality of user equipments is able to select, as its serving radio cell, at least either a first radio cell of the plurality of radio cells or a second radio cell of the plurality of radio cells,
wherein the base station entity is configured such that:
the user equipment itself generates information regarding the at least first and second radio cell and/or receives—from the first radio cell and/or the second radio cell, or from the associated or assigned base station entities, respectively—information regarding the at least first and second radio cell,
the user equipment selects at least one alternative of the list of alternatives comprising
selecting either the first radio cell or the second radio cell, and
requesting on-demand mobility support from the mobile communication network,
wherein the selection is performed, by the user equipment, both in case that the user equipment is currently in idle state and in case that the user equipment is currently in connected state.

Thereby, it is advantageously possible according to the present invention that at least a part of the user equipments associated with the mobile communication network are able to perform a user equipment-based mobility management, i.e. the selection between the first and second radio cell the user equipment seeks to be connected with and/or chooses as its serving radio cell is, at least in many or most cases, made by the user equipment—also while in connected mode.

Additionally, the present invention relates to a program comprising a computer readable program code which, when executed on a computer or on a user equipment or on a base station entity, or in part on the user equipment and in part on the base station entity, causes the computer or the user equipment and/or the base station entity to perform the exemplary embodiments of inventive method.

Still additionally, the present invention relates to computer program product for enhanced mobility management within a mobile communication network, the computer program product comprising a computer program stored on a storage medium, the computer program comprising program code which, when executed on a computer or on a user equipment or on a base station entity, or in part on the user equipment and in part on the base station entity, causes the computer or the user equipment and/or the base station entity to perform exemplary embodiments of the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference FIGURES quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a mobile communication network 100 (or more likely a part thereof) is schematically shown. The mobile communication network 100 comprises an access network 110 and a core network 120. The mobile communication network 100 covers a certain geographical area, thereby using a plurality of radio cells 11, 12, 13. Together, the radio cells 11, 12, 13 cover the geographic area. For reasons of simplicity, only the three radio cells 11, 12, 13 (or a first radio cell 11, a second radio cell 12, and a third radio cell 13) are schematically shown in FIG. 1. However, a typical mobile communication network 100—covering, e.g., a country or at least part thereof—often comprises ten or many tens of radio cells or hundred or many hundreds or even many thousands of radio cells. Furthermore, the mobile communication network 100 comprises a plurality of user equipments, a first user equipment 20, a second user equipment 21, and a third user equipment 22 being exemplarily shown in FIG. 1 representing typically a much higher number of user equipments within the radio coverage area of the mobile communication network 100. As part of the access network 110, the mobile communication network 100 typically also comprises a certain number of base station entities. Three base station entities, a first base station entity 111, a second base station entity 112, and a third base station entity 113, are schematically shown in FIG. 1 likewise representing typically a much higher number of base station entities within the mobile communication network 100. Typically, one base station entity corresponds to (or serves) a radio cell (i.e. according to the exemplary embodiment shown in FIG. 1, the first base station entity 111 corresponds to the first radio cell 11, the second base station entity 112 corresponds to the second radio cell 12, and the third base station entity 113 corresponds to the third radio cell 13), however, it is, at least in principle, conceivable to break up the one-to-one relationship between radio cells and associated (or corresponding base station entities), e.g. by having one (logical) radio cell served by two base station entities (not shown in FIG. 1), or having a plurality of radio cells served by one base station entity, or by a plurality thereof (likewise not shown).

According to the present invention, at least a part of the user equipments 20, 21, 22 are enabled such as to perform a selection between either the first radio cell 11, or the second radio cell 12, and/or to request on-demand mobility support from the mobile communication network 100—whether the respective user equipment 20, 21, 22 is in idle state or in connected state. The base station entities 111, 112, 113 of the first, second and third radio cells 11, 12, 13 broadcast cell resource utilization information, and—especially taking (inter alia) into account this cell resource utilization information—the user equipment 20 is able to calculate a probability of service fulfillment with respect to either of the potential target radio cells, especially based on at least one out of the following:
radio capabilities of the user equipment 20, especially the radio capabilities of the user equipment 20 regarding usable frequency bands, usable modulation schemes, usable multiple input multiple output (MIMO) and/or multipath techniques,
radio capabilities of the potentially selectable radio cells 11, 12, 13, especially the first radio cell 11 and the second radio cell 12, and especially the radio capabilities of the potentially selectable radio cells 11, 12, 13 regarding usable frequency bands, usable modulation schemes, usable multiple input multiple output (MIMO) and/or multipath techniques, cell resource utilization information, especially comprising information about which part of the resources in terms of usable uplink and/or downlink radio transmission bandwidth and/or radio transmission resource blocks is currently already occupied or in tendency likely to be occupied, a class the user equipment 20 is assigned to, especially whether the user equipment 20 is, at least predominantly, an internet-of-things device (IoT device), a mobile broadband device (MBB device), a voice centric device and/or a data centric device, subscription information, especially regarding services the user equipment 20 is allowed to access, bit rates and/or quality-of-service (QoS) levels the user equipment 20 is allowed to use, history information regarding communication services requested by the user equipment 20 in the past and/or prior communication behavior of the user equipment 20, whether the user equipment 20 is currently RRC connected, whether the user equipment 20 is currently packet data network (PDN) connected, characteristics of an active packet data network (PDN) connection, especially in terms of service class, whether the user equipment 20 is currently transmitting data to the mobile communication network 100 and/or receiving data from the mobile communication network 100.

Advantageously, the cell resource utilization information comprise at least one out of the following:

idle load utilization information of the respective radio cell 11, 12, 13, the idle load utilization information being especially based on history information of user equipments connecting to that radio cell 11, 12, 13, connected load utilization information of the respective radio cell 11, 12, 13, the connected load utilization information being especially based on the number of user equipments that have an radio resource control (RRC) connection with that radio cell 11, 12, 13, quality-of-service class utilization information of the respective radio cell 11, 12, 13, the quality-of-service class utilization information especially corresponding to the share of utilized resources per quality-of-service class and/or service data flow class and/or per quality-of-service parameter set such as delay and/or average throughput and/or packet loss, movement-related utilization information of the respective radio cell 11, 12, 13, especially regarding radio cells located close to or adjacent to major human transportation lines, utilization tendency indicator, especially regarding expected growth or decrease of utilization of the resources of the respective radio cell 11, 12, 13.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for enhanced mobility management within a mobile communication network, the mobile communication network comprising an access network having a plurality of radio cells and base station entities, wherein at least one of the base station entities is associated or assigned to each of the radio cells, wherein a plurality of user equipments are associated with the mobile communication network, wherein at least one user equipment of the plurality of user equipments is able to select, as its serving radio cell, at least either a first radio cell of the plurality of radio cells or a second radio cell of the plurality of radio cells, wherein the method comprises:

in a first step, generating, by the user equipment, information regarding the first radio cell and the second radio cell, and/or receiving, by the user equipment, information regarding the first radio cell and the second radio cell from the first radio cell and/or the second radio cell; and in a second step, subsequent to the first step, selecting, by the user equipment, either the first radio cell or the second radio cell, and/or requesting, by the user equipment, on-demand mobility support from the mobile communication network;

wherein the second step is performable by the user equipment both in case that the user equipment is in an idle state and in case that the user equipment is in a connected state;

wherein selecting between the first radio cell and the second cell in the second step is based on:

radio capabilities of the user equipment regarding usable frequency bands, usable modulation schemes, usable multiple input multiple output (MIMO) and/or multipath techniques;

radio capabilities of the potentially selectable radio cells regarding usable frequency bands, usable modulation schemes, usable multiple input multiple output (MIMO) and/or multipath techniques;

cell resource utilization information comprising information about which part of the resources in terms of usable uplink and/or downlink radio transmission bandwidth and/or radio transmission resource blocks is currently already occupied or in tendency likely to be occupied;

whether the user equipment is an internet-of-things device (IoT device), a mobile broadband device (MBB device), a voice centric device and/or a data centric device;

subscription information regarding services the user equipment is allowed to access, bit rates and/or quality-of-service (QoS) levels the user equipment is allowed to use;

history information regarding communication services requested by the user equipment in the past and/or prior communication behavior of the user equipment;

whether the user equipment is currently Radio Resource Control (RRC) connected;

whether the user equipment is currently packet data network (PDN) connected;

characteristics of an active PDN connection in terms of service class; and/or whether the user equipment is currently transmitting data to the mobile communication network and/or receiving data from the mobile communication network.

2. The method according to claim 1, wherein the second step is performable by the user equipment also in case that the user equipment: has a radio resource control connection (RRC connection) with the mobile communication network, or has a packet data network connection (PDN connection) with the mobile communication network, or is engaged in active signaling or data transfer.

3. The method according to claim 1, wherein the plurality of radio cells of the mobile communication network broadcast cell resource utilization information.

4. The method according to claim 3, wherein the cell resource utilization information comprises:

idle load utilization information of a respective radio cell based on history information of user equipments connecting to that radio cell;

connected load utilization information of a respective radio cell based on the number of user equipments that have an radio resource control (RRC) connection with that radio cell;

quality-of-service class utilization information of a respective radio cell corresponding to a share of utilized resources per quality-of-service class and/or service data flow class and/or per quality-of-service parameter set;

movement-related utilization information of a respective radio cell regarding radio cells located close to or adjacent to major human transportation lines; and/or a utilization tendency indicator regarding expected growth or decrease of utilization of the resources of a respective radio cell.

5. The method according to claim 1, wherein selecting between the first radio cell and the second cell in the second step is further based on whether the first radio cell or the second cell has a highest probability of service fulfillment of a communication service that is currently requested by the user equipment, and/or is likely to be requested by the user equipment in future, and/or has been requested by the user equipment in the past.

6. The method according to claim 1, wherein, upon the user equipment selecting the first radio cell or the second radio cell, a service fulfillment information is transmitted, by the user equipment, to the selected radio cell, and wherein a service fulfillment match information is generated by the selected radio cell.

7. The method according to claim 6, wherein selecting between the first radio cell and the second cell in the second step is performed taking into account a hysteresis factor, the hysteresis factor being either generated by the user equipment or assigned to the user equipment or dependent on the service fulfillment match information.

8. A user equipment for enhanced mobility management within a mobile communication network, the user equipment comprising a processor and a non-transitory computer-readable medium having processor-executable instructions stored thereon, wherein the processor-executable instructions, when executed by the processor, facilitate:

generating information regarding a first radio cell and a second radio cell of a mobile communication network, and/or receiving information regarding the first radio cell and the second radio cell; and both in case that the user equipment is in an idle state and in case that the user equipment is in a connected state, selecting, as its serving radio cell, the first radio cell or the second radio cell, and/or requesting on-demand mobility support from the mobile communication network;

wherein selecting the first radio cell or the second cell is based on:

radio capabilities of the user equipment regarding usable frequency bands, usable modulation schemes, usable multiple input multiple output (MIMO) and/or multipath techniques;

radio capabilities of the potentially selectable radio cells regarding usable frequency bands, usable modulation schemes, usable multiple input multiple output (MIMO) and/or multipath techniques;

cell resource utilization information comprising information about which part of the resources in terms of usable uplink and/or downlink radio transmission bandwidth and/or radio transmission resource blocks is currently already occupied or in tendency likely to be occupied;

whether the user equipment is an internet-of-things device (IoT device), a mobile broadband device (MBB device), a voice centric device and/or a data centric device;

subscription information regarding services the user equipment is allowed to access, bit rates and/or quality-of-service (QoS) levels the user equipment is allowed to use;

history information regarding communication services requested by the user equipment in the past and/or prior communication behavior of the user equipment;

whether the user equipment is currently Radio Resource Control (RRC) connected;

whether the user equipment is currently packet data network (PDN) connected;

characteristics of an active PDN connection in terms of service class; and/or whether the user equipment is currently transmitting data to the mobile communication network and/or receiving data from the mobile communication network.

9. A method for enhanced mobility management within a mobile communication network, the mobile communication network comprising an access network having a plurality of radio cells and base station entities, wherein at least one of the base station entities is associated or assigned to each of the radio cells, wherein a plurality of user equipments are associated with the mobile communication network, wherein at least one user equipment of the plurality of user equipments is able to select, as its serving radio cell, at least either a first radio cell of the plurality of radio cells or a second radio cell of the plurality of radio cells, wherein the method comprises:
- in a first step, generating, by the user equipment, information regarding the first radio cell and the second radio cell, and/or receiving, by the user equipment, information regarding the first radio cell and the second radio cell from the first radio cell and/or the second radio cell; and
- in a second step, subsequent to the first step, selecting, by the user equipment, either the first radio cell or the second radio cell, and/or requesting, by the user equipment, on-demand mobility support from the mobile communication network;
- wherein the second step is performable by the user equipment both in case that the user equipment is in an idle state and in case that the user equipment is in a connected state;
- wherein the plurality of radio cells of the mobile communication network broadcast cell resource utilization information;
- wherein the cell resource utilization information comprises:
  - idle load utilization information of a respective radio cell based on history information of user equipments connecting to that radio cell;
  - connected load utilization information of a respective radio cell based on the number of user equipments that have an radio resource control (RRC) connection with that radio cell;
  - quality-of-service class utilization information of a respective radio cell corresponding to a share of utilized resources per quality-of-service class and/or service data flow class and/or per quality-of-service parameter set;
  - movement-related utilization information of a respective radio cell regarding radio cells located close to or adjacent to major human transportation lines; and/or
  - a utilization tendency indicator regarding expected growth or decrease of utilization of the resources of a respective radio cell.

10. A user equipment for enhanced mobility management within a mobile communication network, the user equipment comprising a processor and a non-transitory computer-readable medium having processor-executable instructions stored thereon, wherein the processor-executable instructions, when executed by the processor, facilitate:
- generating information regarding a first radio cell and a second radio cell of a mobile communication network, and/or receiving information regarding the first radio cell and the second radio cell; and
- both in case that the user equipment is in an idle state and in case that the user equipment is in a connected state, selecting, as its serving radio cell, the first radio cell or the second radio cell, and/or requesting on-demand mobility support from the mobile communication network;
- wherein a plurality of radio cells of the mobile communication network are configured to broadcast cell resource utilization information;
- wherein the cell resource utilization information comprises:
  - idle load utilization information of a respective radio cell based on history information of user equipments connecting to that radio cell;
  - connected load utilization information of a respective radio cell based on the number of user equipments that have an radio resource control (RRC) connection with that radio cell;
  - quality-of-service class utilization information of a respective radio cell corresponding to a share of utilized resources per quality-of-service class and/or service data flow class and/or per quality-of-service parameter set;
  - movement-related utilization information of a respective radio cell regarding radio cells located close to or adjacent to major human transportation lines; and/or
  - a utilization tendency indicator regarding expected growth or decrease of utilization of the resources of a respective radio cell.

* * * * *